No. 750,970. PATENTED FEB. 2, 1904.
J. W. HARMON.
RIDING HARROW.
APPLICATION FILED OCT. 12, 1903.
NO MODEL. 2 SHEETS—SHEET 2.

Witnesses
E. F. Stewart
Wm. Bagger

John W. Harmon
Inventor
by C. A. Snow & Co.
Attorneys

THE NORRIS PETERS CO., PHOTO-LITHO., WASHINGTON, D. C.

No. 750,970. Patented February 2, 1904.

UNITED STATES PATENT OFFICE.

JOHN WILLIAM HARMON, OF CRESTON, IOWA.

RIDING-HARROW.

SPECIFICATION forming part of Letters Patent No. 750,970, dated February 2, 1904.

Application filed October 12, 1903. Serial No. 176,774. (No model.)

*To all whom it may concern:*

Be it known that I, JOHN WILLIAM HARMON, a citizen of the United States, residing at Creston, in the county of Union and State of Iowa, have invented a new and useful Riding-Harrow, of which the following is a specification.

This invention relates to riding-harrows; and it has for its object to provide a device of this class which shall possess superior advantages in point of simplicity, durability, and general efficiency.

My improved harrow comprises a plurality of sections which are connected in couples by superimposed connecting-bars, said connecting-bars being again connected in couples by a frame-bar with which the seat-supporting bar is adjustably connected.

The invention further comprises a truck suitably connected with the harrow-sections, said truck being also provided with supporting means for the seat-supporting bar.

The invention further consists in the improved construction, combination, and arrangement of parts, which will be hereinafter fully described, and particularly pointed out in the claims.

Figure 1:
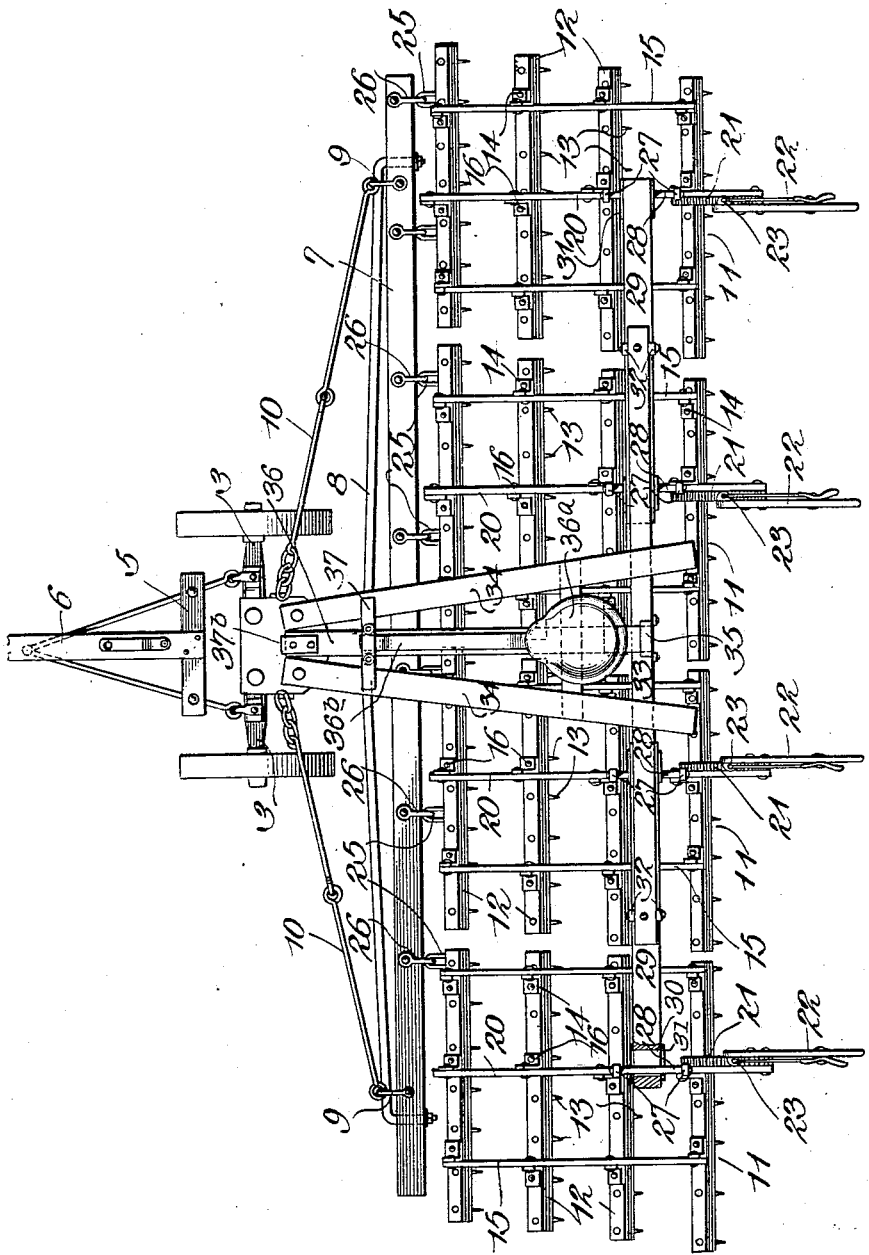
Figure 2:
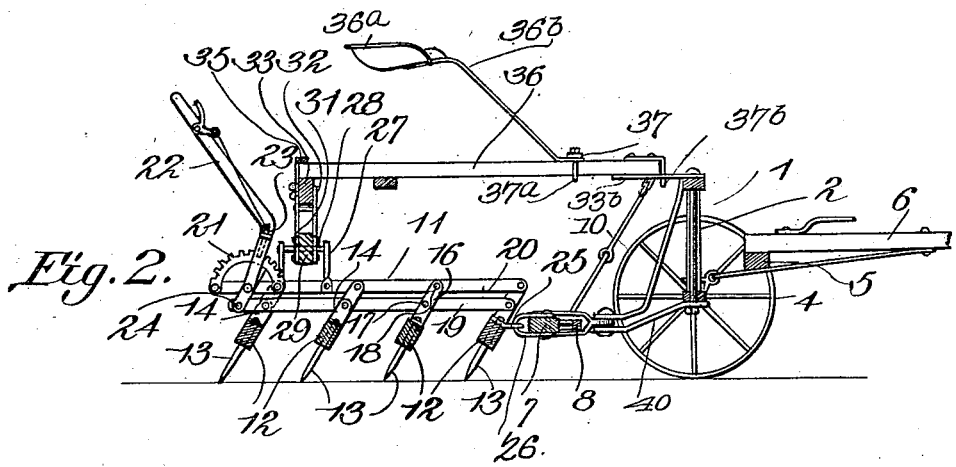
Figure 3:
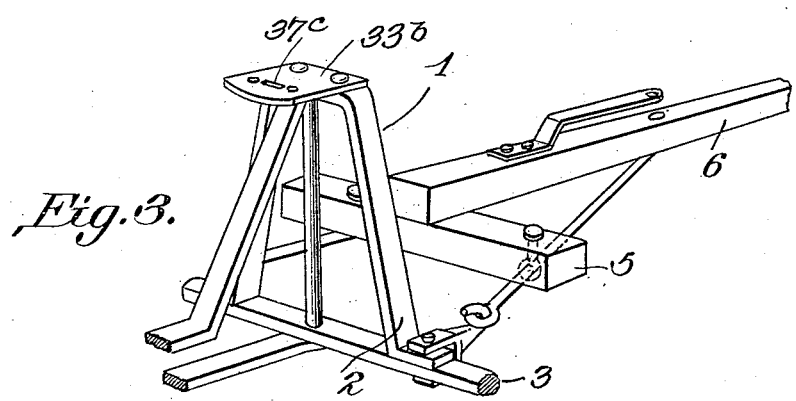
Figure 5:
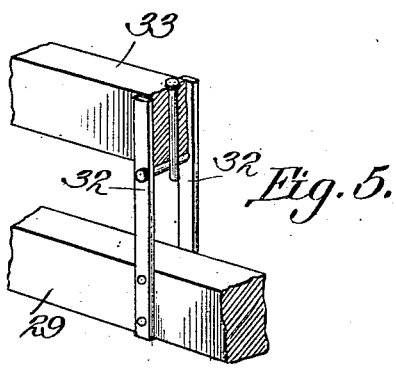
Figure 4:
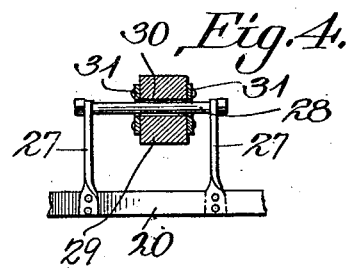

In the accompanying drawings, Figure 1 is a top plan view of a harrow constructed in accordance with the principles of my invention. Fig. 2 is a longitudinal vertical sectional view of the same. Fig. 3 is a perspective view showing a portion of the front truck and the frame-bars connected with the same. Figs. 4 and 5 are detail views showing the connecting means of the harrow-sections.

Corresponding parts in the several figures are indicated by similar numerals of reference.

1 designates a truck, which in the drawings has been shown as consisting of an arched axle 2, having spindles 3, carrying wheels 4. Suitably connected with the arched axle 2 is a cross-piece 5, from which the tongue 6 extends forwardly, as shown, said tongue being provided with well-known means for the attachment of the draft.

7 designates a draw-bar, the front side of which is reinforced by a truss-rod 8. Said draw-bar is provided near its ends with clevises 9, connected by link rods and chains 10 with the arched portion of the axle 2, from which draft in a forward direction may thus be imparted to the draw-bar.

The harrow proper is composed of a plurality of sections 11, of which in the accompanying drawings four have been shown. Each of said sections comprises a plurality of tooth-carrying bars 12, having downwardly-extending teeth 13 and upwardly-extending transversely-perforated lugs 14, which are pivotally connected with the connecting-rods 15, of which any desired number may be employed. The lugs 14 and connecting-rods 15 serve simply for the purpose of connecting and assembling the parts; but each of the tooth-bars 12 is additionally provided with a lug 16, having two perforations 17 and 18, the lower perforations 17 being connected by pins with a connecting-rod 19, which extends rearwardly of the rear tooth-carrying bar. The upper perforations 18 are likewise connected by pins with a connecting-bar 20, which extends rearwardly of the rear end of the lower connecting-rod 19, which carries a segment-rack 21, concentrically with which is pivoted an operating-lever 22, having a spring-actuated lock-dog 23 of ordinary construction to engage the rack-segment, and thereby secure the lever at any desired point of adjustment. The lever 22 is, moreover, extended downwardly and has pivotal connection at 24 with the lower connecting-rod 19. The front tooth-carrying bar 12 of each harrow-section is connected by means of links 25 with clevises 26, extending rearwardly from the draw-bar, with which the several harrow-sections are thus flexibly connected. The connecting-bar 20 of each harrow-section is provided with a pair of upwardly-extending quarter-twisted brackets 27, connected by a pin or bolt 28, upon which is loosely mounted a connecting-bar 29, which serves to connect the harrow-sections together in couples. Each of the connecting-bars 29 is provided near its ends with slots 30, which are faced with wear-plates 31, suitably secured to the front and rear side of said connecting-bar and engaging the pins or bolts 28, thus enabling the said connecting-bars to have free movement or play in a forward and rearward direction as well as laterally with relation to the harrow-sections. Each of the connecting-bars is likewise provided with a pair of uprights 32, between which a superimposed supporting-bar 33 is loosely mounted in such a manner that there will be free lateral play between the connected parts. The supporting-bar 33 and a supporting-plate $33^b$, mounted upon the arched axle 2 of the truck serve in conjunction to support a pair of frame-bars 34, by means of which the harrow is connected with the truck, additional connecting means having been already described. The rear side of the supporting-bar 33 is provided with a yoke or clevis 35, securely bolted thereto and extending somewhat above its upper edge for the reception of the rear end of a seat-supporting bar 36, which when inserted into said clevis is retained securely therein by the weight of the seat $36^a$, the spring-bar $36^b$ of which is attached to said bar adjustably by means of a clip $37^a$ and the additional weight of the operator. At the same time the seat-bar and seat are capable of being longitudinally adjusted by simply elevating the front end of the seat-supporting bar, when it may be slid in a forward or rearward direction through the yoke 35. The cross-bar 37 of the clip $37^a$ is sufficiently long to be supported upon the frame-bars 34, so as to prevent the seat-bar from being depressed too far or broken by the weight of the operator. The front end of the seat-supporting bar has a hook $37^b$ engaging a slot $37^c$ in the supporting-plate $33^b$, whereby it is detachably connected with the front truck. The seat, as already stated, may be adjusted longitudinally upon the seat-supporting bar for the purpose of transferring the weight of the operator in the direction of the truck or in the direction of the harrow, as may be thought desirable.

From the foregoing description, taken in connection with the drawings hereto annexed, the operation and advantages of my invention will be readily understood. The construction of the individual harrow-sections is simple in the extreme, and it will be readily understood how by manipulating the levers 22 the teeth of the several sections may be tilted to any desired degree of inclination. The individual harrow-sections are mounted flexibly and are entirely independent of each other, thereby readily accommodating themselves to irregularities in the surface of the land which is being tilled. The draft exercised upon the several harrow-sections is equalized by means of the draw-bar to which they are attached, said draft being mainly from the top of the arched axle, although additional draft-bars may be employed to connect the lower ends of the legs of the axle with the central portion of the draft-bar, as will be seen at 40.

Generally speaking, I desire it to be understood that while I have in the foregoing described what I consider to be a simple and preferred form of my invention I do not necessarily limit myself to the structural details herein set forth, but reserve the right to any changes, alterations, and modifications which may be resorted to without departing from the spirit or scope of my invention or sacrificing the utility of the same.

Having thus described my invention, I claim—

1. In a device of the class described, a plurality of harrow-sections connected in couples, a superimposed connecting-bar movably connecting the several couples of harrow-sections, a draw-bar connected flexibly with the several harrow-sections, a riding-truck, means connecting the latter with the draw-bar and additional means connecting said truck with the superimposed connecting-bar of the harrow-sections.

2. In a device of the class described, a plurality of harrow-sections, a draw-bar connecting the same, flexibly-mounted supporting and connecting means superimposed upon said harrow-sections, a riding-truck, connecting means between the latter and the draw-bar, auxiliary connecting means between the truck and the superimposed connecting means of the harrow-sections, and a longitudinally-movable seat-supporting bar adjustably connected with said supporting means.

In testimony that I claim the foregoing as my own I have hereto affixed my signature in the presence of two witnesses.

JOHN WILLIAM HARMON.

Witnesses:
MARTIN A. WILSON,
F. F. CULVER.